United States Patent
Bertelli

[11] 3,751,022
[45] Aug. 7, 1973

[54] MOTORCYCLE SUSPENSION DEVICE
[75] Inventor: Giuseppe Bertelli, Bologna, Italy
[73] Assignee: S.E.B.A.C. S.p.A., Bologna, Italy
[22] Filed: June 14, 1971
[21] Appl. No.: 152,811

[30] Foreign Application Priority Data
Jan. 21, 1971 Italy................................ 3314 A/71

[52] U.S. Cl. ............................................... 267/60
[51] Int. Cl. ............................................... F16f 5/00
[58] Field of Search ................................ 267/60, 61

[56] References Cited
UNITED STATES PATENTS
3,157,392 11/1964 Kitamura ............................. 267/60
3,444,749 5/1969 Ruprecht et al. ..................... 267/61

FOREIGN PATENTS OR APPLICATIONS
675,075 7/1952 Great Britain ........................ 267/60

*Primary Examiner*—James B. Marbert
*Attorney*—Robert E. Burns et al.

[57] ABSTRACT

An inexpensive suspension device for motorcycles, motorbikes and the like. A spring has externally threaded centers made of molded synthetic resin threaded axially into opposite ends of the spring. Each spring center has an integral eye disposed axially outwardly of the spring for mounting the device. Synthetic resin sleeves are disposed on opposite ends of the spring circumferentially of the convolutions or spring coils on which the centers are threaded. A rod axially of the spring is fixed to one of the centers and the other spring center has an axial blind bore within which is disposed a sleeve in which the rod moves reciprocably as the device and spring are variably loaded axially. The device is easily assembled by mounting the end sleeves on the respective centers and threading the center with the blind bore on one end of the spring and then threading on the other spring center on the opposite end. The axial rod then moves reciprocably in the sleeve in the blind bore as the device is variably loaded axially and the spring oscillates.

2 Claims, 2 Drawing Figures

PATENTED AUG 7 1973 3,751,022
FIG.1
FIG.2
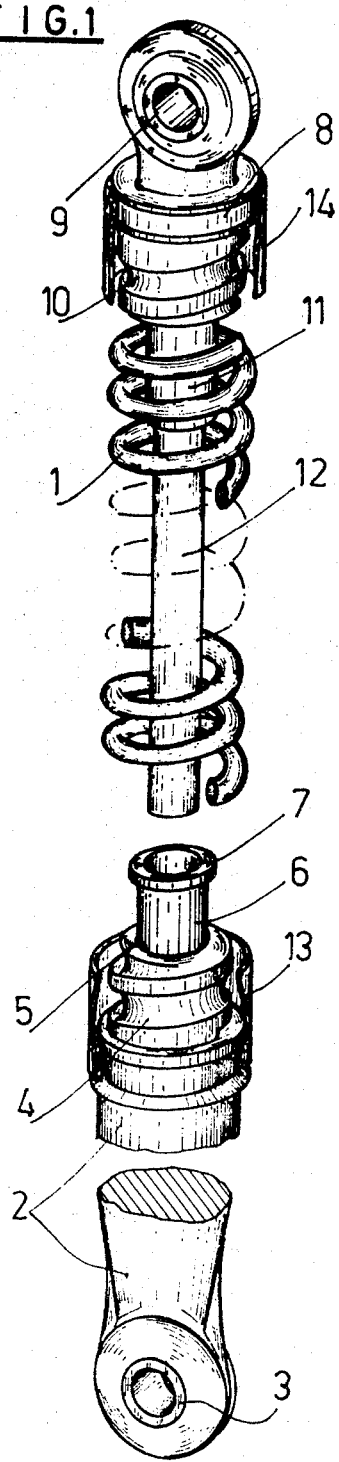
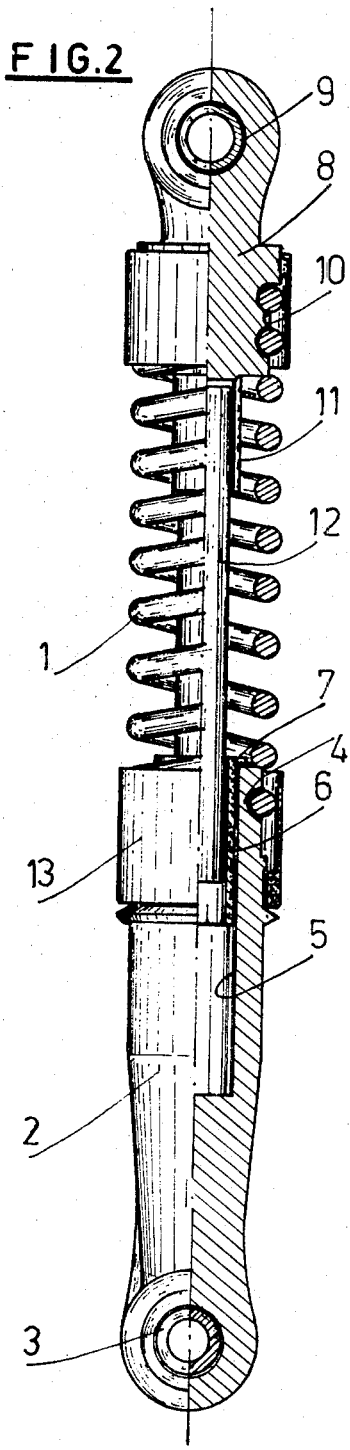

MOTORCYCLE SUSPENSION DEVICE

BACKGROUND OF THE INVENTION

The present invention relates to suspension devices and more particularly to a suspension device for motorcycles, motorbikes and the like.

DESCRIPTION OF PRIOR ART

Motor vehicles make use of various types of elastic suspension systems which damp out and/or filter out oscillations or shocks applied to the vehicle wheels by the unevenness of the road. The suspension devices prevent or at least mimimize the transmission of oscillations or shocks to the frame of the vehicle and therefore to the vehicle driver and passengers thereof. This improves the riding comfort. Suspension systems provide a reaction against longitudinal load strain during the application of the brakes to the vehicle and the loading of the vehicle upon starting accelerations.

The suspension systems used in motorcycles are generally relatively compression springs having large coils or convolutions enclosed in the metal telescopic forks supporting the front and rear wheels of the motorcycle. The manufacture of these known suspension devices requires accurate machine operations and the assembling of the various components constitutes a particularly difficult work requiring skilled personnel. Accordingly, manufacturing costs are high.

SUMMARY OF THE INVENTION

It is the principal object of the invention to provide a new and inexpensive elastic suspension device for motorcycles and motorbikes and the like.

Another object is to provide a suspension device that can be readily and inexpensively manufactured and assembled.

In accordance with the invention the suspension device comprises an elongated spring having a first threaded center threaded axially into one end of the spring and a second threaded center threaded axially into the opposite end of the spring. These centers are made of synthetic resin and each have an integral eye extending axially outwardly of the spring for mounting the device. One of the spring centers has a blind axial bore in which is disposed a press fitted sleeve. A rigid rod is secured by molding on the other spring center and it extends axially through the sleeve into the aforementioned sleeve in which it moves reciprocably as the spring compresses and extends axially as the device and the spring are loaded axially. The device is provided with synthetic resin sleeves at opposite ends circumferentially about the convolutions on which the centers are threaded.

BRIEF DESCRIPTION OF THE DRAWINGS

Other objects and advantages of the suspension device in accordance with the invention will appear from the following description of an example of the invention and the novel features will be particularly pointed out in the specification, the appended claims and the drawings in which:

FIG. 1 is an exploded side elevation view of a device in accordance with the invention; and FIG. 2 is a side elevation view, partly in section, of a suspension device in accordance with the invention.

DESCRIPTION OF THE PREFERRED EMBODIMENTS

In accordance with the drawing a coil spring 1 has an elongated threaded center 2 having on a portion 4 thereof external threads complementary to the convolutions or coils on one end of the spring and is threaded axially into the spring as illustrated. The spring center 2 has an integral eye axially outwardly of the spring and within which is mounted an integral ring 3 for fastening the suspension device. This first spring center 2 has a blind axial bore 5 in which a suitably molded synthetic resin sleeves 6 is force fitted. This sleeve is provided with an integral flange 7 at an end thereof extending axially outwardly of the blind bore of the spring center 2.

A second spring center 8 is provided with an externally threaded portion 10 threaded axially into an opposite end of the spring 1. The threads on this portion likewise have threads complementary to the convolutions or coils of the opposite end of the spring. The second spring center likewise has an integral eye axially outwardly of the spring within which is integrally mounted a ring 9 for fastening or mounting the opposite end of the device. This second spring center comprises a tubular portion 11 of lesser diameter than the inner diameter of the ring 1 for receiving axially therein a rod 12 secured thereto, for example by molding. The rod 12 extends axially through the spring and moves reciprocably in the sleeve 6 within the blind bore of the opposite spring center when the suspension device and the spring thereof are variably loaded axially.

The device is provided at opposite ends with sleeves 13,14 made of a suitable synthetic resin to conceal and protect the threaded portions of the centers 2 and 8 respectively. These sleeves are snapped-on or otherwise snugly fitted on the respective centers on portions thereof extending axially outwardly of the spring convolutions and are disposed circumferentially outwardly of the convolutions or spring coils on which the centers are threaded as illustrated in the drawing.

The components of the suspension system or device assembly are inexpensively manufactured and the device is likewise easily assembled by un-skilled help. The device is assembled by first taking the covering sleeve 13 and snap-fitting or press-fitting it to the first spring center 2 and then this center is threaded axially into one end of the coil spring 1. The other covering sleeve 14 is likewise slipped on the other or second spring center 8 and is snap-fitted or press-fitted thereon. The rod 12 is inserted axially through the spring 1 so that its free end fits axially into the flanged sleeve 6 while the other end thereof is fixed in the tubular part of the other center spring. Thus when the spring center having the rod fixed thereto is threaded into the opposite end of the spring the rod extends axially into the sleeve in the blind bore of the opposite end spring center.

Those skilled in the art can really understand that the suspension device according to the invention is extremely simple in construction and can be easily assembled so that both the construction and assembly thereof afford substantial savings in manufacture of the device as against conventional constructions and assembly of such devices.

The shape of the spring is shown as round and the spring centers are cylindrical, however, it will be understood that the shapes and dimensions of the various elements including the spring and spring centers as well as the covering sleeves may be modified without departing frim the basic principles of the invention as set forth in the appended claims.

The two centers 2, 8 are made with the respective eyes and rings 3, 9, integral therewith. These centers are molded of a suitable resin capable of resisting stresses and impact. A suitable resin is called "MOLPEN" made by Montecatini Edison S.p.A. Via Candiani 144, Milan, Italy. The rings are made of steel and molded in place on the centers. These centers are covered and protected on the threaded portions by the sleeves made of a flexible synthetic resin as before described.

What I claim and desire to secure by letters patent is

1. A suspension device comprising, an elongated spring, a first threaded center made of a synthetic resin and theaded axially into one end of said elongated spring and having an eye integral therewith disposed axially outwardly of said spring, a second threaded center made of a synthetic resin and threaded axially into said spring at another end thereof and having an eye integral therewith disposed axially outwardly of said spring, said centers each having an axial length less than the axial length of the spring, said first center having means defining a blind axial bore, a synthetic resin sleeve extending axially in said bore, a rod disposed axially in said spring fixed at one end to said second center and extending axially into said bore for reciprocable travel therein as said spring compresses and extends axially when said device and said spring are loaded axially, said first threaded center and said second threaded center each having external threads and each comprising threads complementary to convelutions at opposite ends of said spring.

2. A suspension device according to claim 1, including a first sleeve made of synthetic resin and snap-fitted on said first threaded center and disposed circumferentially of said convolutions of said spring on which said first center is axially threaded, and a second sleeve made of synthetic resin and snap-fitted on said second threaded center and disposed circumferentially of said convolutions of said spring on which said second center is threaded.

* * * * *